Figure 1:
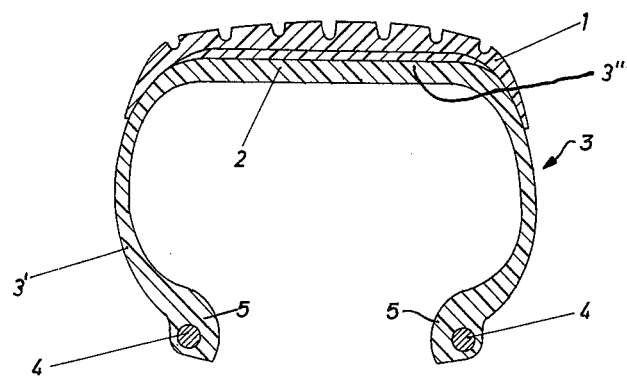
Figure 2:
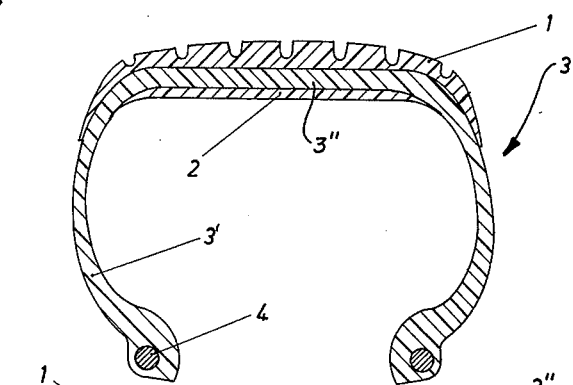

United States Patent [19]

Schmidt

[11] 4,090,547
[45] May 23, 1978

[54] PNEUMATIC TIRE FOR VEHICLES

[75] Inventor: Oskar Schmidt, Kittsee, Austria

[73] Assignee: Lim-Holding S.A., Luxembourg, Luxembourg

[21] Appl. No.: 771,311

[22] Filed: Feb. 23, 1977

Related U.S. Application Data

[63] Continuation of Ser. No. 569,159, Apr. 18, 1975, abandoned.

[51] Int. Cl.² .................................................. B60C 9/12
[52] U.S. Cl. ........................ 152/354 R; 152/357 R; 152/361 R
[58] Field of Search ............... 152/357 A, 357 R, 354, 152/361 R, 374

[56] References Cited

U.S. PATENT DOCUMENTS

| | | | |
|---|---|---|---|
| 3,192,984 | 7/1965 | Bourdon | 152/357 A |
| 3,537,500 | 11/1970 | Beneze | 152/357 A |
| 3,759,306 | 9/1973 | Greiner et al. | 152/361 R |
| 3,782,440 | 1/1974 | Depmeyer | 152/357 A |
| 3,902,542 | 9/1975 | Imamura et al. | 152/361 R |
| 3,916,968 | 11/1975 | Masson | 152/361 R |

*Primary Examiner*—Drayton E. Hoffman
*Assistant Examiner*—Carl Rowold
*Attorney, Agent, or Firm*—Karl F. Ross

[57] ABSTRACT

A tire body of elastomeric material, terminating in two beads on opposite sides of its cavity, has a sole free of reinforcing cords carrying a tread on its outer surface and a belt of elastomeric material disposed either between the tread and the body or on the inner body surface. The belt has a stress/strain ratio at 20° C and with 50% elongation which is at least 30% higher than the corresponding stress/strain ratio of the tire body.

9 Claims, 4 Drawing Figures

PNEUMATIC TIRE FOR VEHICLES

This is a continuation of application Ser. No. 569,159, filed Apr. 18, 1975, now abandoned.

This invention relates to a cast or injection molded pneumatic vehicular tire whose toroidal body of elastomeric material, forming a cavity, terminates at a pair of beads and has a tread-carrying sole devoid of reinforcing cords.

In various prior publications it has been proposed to manufacture cast pneumatic vehicular tires free of reinforcing cords. Such pneumatic tires incorporate flexible materials which have a high stress/strain ratio with little elongation. These pneumatic tires have the disadvantage that the use of a material having a high stress/strain ratio involves large shear forces in the flexing zone and the resulting fatigue causes early destruction of the tire (see published German specification No. 2,249,172). For instance, tires have been manufactured which have a body made of a material having a Shore hardness of, e.g., 88° or higher, these tires failed after a relatively small mileage. To avoid this destruction due to fatigue, cast pneumatic tires have been developed which have a body made of a material that has a relatively low stress/strain ratio (U.S. Pat. No. 3,701,374). Because the stresses in a pneumatic tire are not uniformly distributed and the highest stresses occur in the sole next to the tread, faults tend to develop in such pneumatic tires as a result of locally increased stresses in the tire body. The destruction of such tires is due to the relatively large elongation, which results in an excessively high wear at the tread, rather than to the fatigue in the flexing zone.

It was later attempted to reduce the extension adjacent to the tread by the use of thicker sidewalls (published German specification No. 2,201,747), yet this has the disadvantage that the weight of the tire is increased, so that the manufacturing costs and the moving masses are increased too and additional problems arise as regards the design of the motor vehicles.

It is an object of my present invention to eliminate these disadvantages by the use of a different concept. The tire according to my invention comprises a substantially cylindrically curved belt extending along the periphery of its toroidal body inwardly of its tread, as is known per se, and the stress/strain ratio of that belt at 20° C and with 50% elongation is at least 30% higher than stress/strain ratio of the remaining tire body. According to another feature of the invention the tire body has a stress/strain ratio between 30 and 135 kg/cm² at 20° C and with 50% elongation whereas the belt has a stress/strain ratio between 120 and 400 kg/cm² at 20° C and with 50% elongation.

Depending on the ratio of its cross-sectional dimensions and the stress/strain ratio of its material, the belt has preferably a thickness of 1-10 mm.

In manufacturing cast or injection-molded pneumatic tires according to my invention, the prefabricated belt is placed in a mold cavity and is positioned therein so as to be spaced from the cavity-defining surfaces of the mold, if desired, and the body inclusive of the tread is then cast or injection-molded in that mold, or the body and the tread are made from different materials in two successive process steps.

In a modification of this process, the tire body is first cast or injection-molded in the mold cavity, another mold cavity is then provided in which the belt is directly cast or injection-molded onto the tire body, and finally the tread is cast or injection-molded onto the tire-body and belt in further cavity.

In this process the tire is built from the inside outwardly. This affords the important advantage that the shrinkage of the materials during the curing step tends to strengthen the bond between adjacent layers. In the previously used centrifugal casting process exactly the opposite result is produced so that the bond strength between the layers tends to diminish.

Elastomers which can be used within the scope of the invention include all high polymers with freezing points below −10° C, having elastomeric chains which include structures that can form cross-links as a result of electrostatic forces acting in different directions, and structures which can form covalent cross-links. Particularly suitable elastomers include the polyurethanes.

The ratio of the cross-sectional dimensions of the tire is the ratio of the height of its cross-section to the largest width of the body of the tire under operating conditions.

The invention will now be explained more fully with reference to examples and embodiments shown by way of illustration in the accompanying diagrammatic drawing, in which FIGS. 1-4 are a transverse sectional views of different embodiments of a pneumatic vehicular tire according to the invention, each tire comprising a tread 1, a belt 2, a toroidal body 3 and beads 5 having steel-wire cores 4. The toroidal body 3 has a pair of sidewalls 3', flanking its cavity, integral with a sole 3" carrying the tread 1.

Examples of process for making a tire according to the invention will now be described.

EXAMPLE 1

A mold-charging unit sold under the designation SAL by Polyair Maschinenbau Ges.m.b.H., Kittsee, Austria, was used. The containers for the components were charged with the appropriate components used to produce a polyurethane elastomer from a prepolymer. The prepolymer was a reaction product of polytetramethylene glycol and toluylene diisocyanate and contained 4.1% free NCO (such as Adiprene L 100, a product of DuPont de Nemours & Co.). The prepolymer was outgassed at 80° C under a vacuum of up to 30 mm Hg for 2 hours with stirring. Methaphenylenediamine was used as an extender and was melted and held at 60° C in the second container of the mold-charging unit. The unit was adjusted so that Adiprene and metaphenylenediamine were metered in a weight ratio of 100:5.

The tire mold comprised a core, which defined the inner surface of the tire, and two opposite side parts, which held the core in a centered position and defined the lateral surfaces of the tire, as well as two sets of four peripheral segments, which defined the tread of the tire and were held exactly in position by the side parts of the mold to form the outer boundary of the mold cavity. The mold was heated to 60° C and provided with a silicone parting agent in a thin layer; it was closed after the steel-wire cores 4 for the beads had been inserted. The bead cores 4 were located in the mold by means of magnetic pins so that the reaction mixture could freely flow around the bead cores. The mold parts which defined the cavity for molding the tire body 3 were vacuum-tightly joined. The mold was then evacuated and charged with the reaction mixture from the mold-charging unit.

A second, similar mold-charging unit was filled with a prepolymer made from polytetramethylene glycol and toluylene diisocyanate and containing 7% free NCO (a mixture of 2 parts Adiprene L 167 and one part L 315, which are both sold by DuPont de Nemous & Co.), and with methylenebis-chloroaniline (Moca).

The prepolymer was outgassed as described hereinbefore and the Moca was melted and held at 110° C. When the tire body 3 had cured, the peripheral mold segments were removed. On the surface from which the peripheral segments had been removed, the body 3 was coated with GP 21 bonding agent sold by Polyair Maschinenbau Ges.m.b.H. and the peripheral mold segments were then replaced.

A reaction mixture was prepared which contained prepolymer and Moca in a weight ratio of 100:20 and was charged into the mold.

To complete the tire, a third mold-charging unit was made available and was filled with a prepolymer made from adipic acid ethylene glycol having a molecular weight of 2000, and diphenylenemethylene diisocyanate. The prepolymer contained 9.5% free NCO (Addukt 70 sold by Polyair Maschinenbau Ges.m.b.H.).

1,4-butanediol with an addition of 10% of a catalyst (triethyldiamine) was used as an extender. The prepolymer and the extender were metered at a weight ratio of 100:9.5. When the belt 2 had cured, the mold segments were removed and the exposed surface of the belt was coated with the bonding agent as prescribed. The peripheral mold segments for forming the tread profile were inserted and the mold was evacuated and was then filled with the reaction mixture from the third mold-charging unit. After ten minutes the mold was opened, the tire was removed from the mold, the core was removed from the tire, and the tire was heated at 100° C for 10 hours. The resulting tire, of the configuration shown in FIG. 1, had the belt 2 sandwiched between the sole 3" and the tread 1.

This tire, having a size of 165×13 cm, was inflated to a pressure of 1.7 kg/cm² above atmospheric pressure. After a run of 20,000 km, its profile had been reduced by only 1.5 mm.

Test specimens were cut out of tires and tested for stress/strain ratio with the following results:
Tire body — 60 kg/cm²
Belt — 150 kg/cm²
Tread — 40 kg/cm²

EXAMPLE 2

In a separate cavity mold, which was properly dimensioned, a belt 2 was made from the material described in Example 1 in conjunction with the mold-charging unit. The belt was coated with the above-mentioned bonding agent and located on the mold core and together with the latter was placed in the tire mold. The steel-wire cores 4 for the beads were inserted and the tire body 3 was then cast as in Example 1. In both Examples the belt 2 had a thickness of 3 mm in the middle of the tire. The tread was then formed as described in Example 1. The resulting tire, shown in FIG. 2, had the sole 3" internally lined with the belt 2.

EXAMPLE 3

Figure 3:
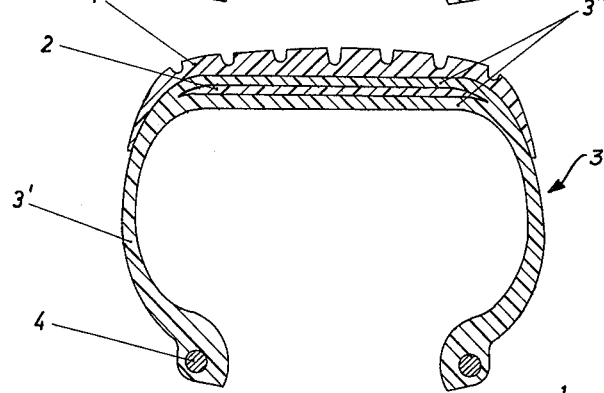

A belt 2, made as described in Example 2 but designed for use in the same tire mold, was about 5 mm larger in diameter and somewhat modified by being formed with 2.5-mm-high projections which were spaced about 10 cm apart and distributed over the surface facing the mold core. When this belt had been coated with the above-mentioned bonding agent, it was applied to the core of the cavity mold for making the tire. The body 3 and the tread 1 were cast as described in Example 1. In this instance, as shown in FIG. 3, the belt 2 was imbedded in the sole 3".

EXAMPLE 4

A belt 2 was made and applied to the mold core as described in Example 3. After the steel-wire bead cores 4 had been positioned, the peripheral mold segments were emplaced to close the tire mold. A mold-charging unit as described in Example 1 was filled with Adiprene L-83 rather than Adiprene L 100. The metering ratio was changed to 4.1 parts methaphenylenediamine per 100 parts Adiprene L-83. The tire mold was filled with this reaction mixture so that the tread 1 and the tire body 3 were made from a the same material, which flowed around the belt 2.

Figure 4:
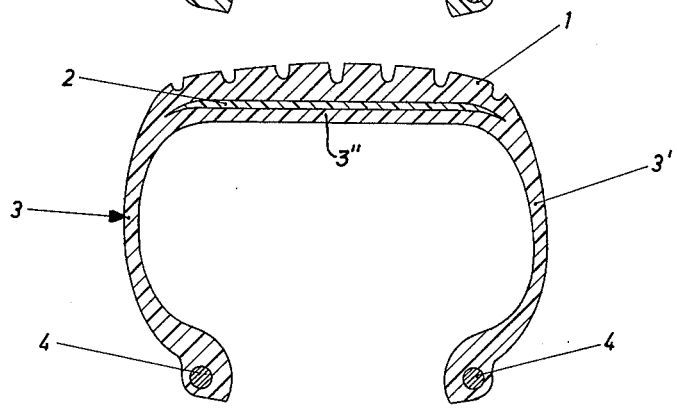

Whereas the tires according to this Example, shown in FIG. 4, can be made at lower cost, they have the disadvantage that the grip of the tread on the road is inferior compared to the conventional tires so that these tires can be used only for low speed vehicles.

What is claimed is:

1. A pneumatic vehicular tire comprising:
   a toroidal body of a first elastomeric material with sidewalls integrally interconnected by a sole carrying a tread, said sidewalls terminating in a pair of beads, said body being provided with reinforcing cords only in said beads; and
   a substantially cylindrically curved belt of a second elastomeric material extending along the periphery of said body inwardly of said tread;
   1 said second elastomeric material having a stress/strain ratio, at 20° C and with 50% elongation, exceeding the corresponding stress/strain ratio of said first elastomeric material by at least 30%;
   said stress/strain ratio of said first elastomeric material ranging between substantially 30 and 135 kg/cm², said stress/strain ratio of said second elastomeric material ranging between substantially 120 and 400 kg/cm².

2. A tire as defined in claim 1 wherein said belt has a thickness ranging between substantially 1 and 10 mm.

3. A tire as defined in claim 1 wherein said first and second elastomeric materials are polyurethanes.

4. A tire as defined in claim 1 wherein said tread consists of a third elastomeric material having a stress/strain ratio lower than that of said first elastomeric material.

5. A tire as defined in claim 4 wherein said belt is inserted between said sole and said tread.

6. A tire as defined in claim 4 wherein said belt lines the inner surface of said sole.

7. A tire as defined in claim 4 wherein said belt is embedded in said sole.

8. A pneumatic vehicular tire comprising:
   a toroidal body of a first elastomeric material with sidewalls integrally interconnected by a sole;
   a substantially cylindrically curved belt of a second elastomeric material extending along the periphery of said body outwardly of said sole; and
   a tread of a third elastomeric material carried on said sole, said belt lying between said sole and said tread;
   said second elastomeric material having a stress/strain ratio, at 20° C and with 50% elongation, exceeding the corresponding stress/strain ratio of said first elastomeric material by at least 30%;

said stress/strain ratio of said first elastomeric material ranging between substantially 30 and 135 kg/cm², said stress/strain ratio of said second elastomeric material ranging between substantially 120 and 400 kg/cm².

9. A pneumatic vehicular tire comprising:

a toroidal body of a first elastomeric material with sidewalls integrally interconnected by a sole;

a substantially cylindrically curved belt of a second elastomeric material extending along the periphery of said body inwardly of said sole; and a tread of a third elastomeric material carried on the outer surface of said sole;

said second elastomeric material having a stress/strain ratio, at 20° C and with 50% elongation, exceeding the corresponding stress/strain ratio of said first elastomeric material by at least 30%, said third elastomeric material having a stress/strain ratio lower than that of said first elastomeric material;

said stress/strain ratio of said first elastomeric material ranging between substantially 30 and 135 kg/cm², said stress/strain ratio of said second elastomeric material ranging between substantially 120 and 400 kg/cm².

* * * * *